(12) United States Patent
Martin

(10) Patent No.: US 7,296,958 B1
(45) Date of Patent: Nov. 20, 2007

(54) GRAND PIANO LYRE CRUTCH

(76) Inventor: Herbert Martin, 2835 Gundry Ave., Signal Hill, CA (US) 90755-1812

(*) Notice: Subject to any disclaimer, the term of this patent is extended or adjusted under 35 U.S.C. 154(b) by 407 days.

(21) Appl. No.: 10/835,851

(22) Filed: Apr. 29, 2004

(51) Int. Cl.
*B65G 67/30* (2006.01)

(52) U.S. Cl. .................. 414/373; 414/470; 414/917; 414/473; 187/233

(58) Field of Classification Search ............ 414/743, 414/470, 917, 684, 458, 495, 816, 343, 589, 414/590, 373; 248/231.61, 229.24, 228.5, 248/230.5, 371–398
See application file for complete search history.

(56) References Cited

U.S. PATENT DOCUMENTS

| | | | | |
|---|---|---|---|---|
| 359,046 A | * | 3/1887 | Woodworth | 248/231.61 |
| 395,371 A | * | 1/1889 | Weser | 254/3 R |
| 1,660,721 A | * | 2/1928 | Schrag | 602/16 |
| 2,229,320 A | * | 1/1941 | Balzano et al. | 108/75 |
| 2,574,007 A | * | 11/1951 | Anderson | 248/662 |
| 4,122,958 A | * | 10/1978 | Thayer | 414/373 |
| 4,331,324 A | * | 5/1982 | Andary | 254/2 R |
| 4,415,149 A | * | 11/1983 | Rees | 269/88 |
| 4,475,714 A | * | 10/1984 | Heiskell et al. | 254/89 H |
| 4,539,913 A | * | 9/1985 | Marchant | 108/7 |
| 4,588,346 A | * | 5/1986 | Smith | 414/673 |
| 4,913,614 A | | 4/1990 | O'Rarden | |
| 4,924,894 A | * | 5/1990 | Martinez | 135/65 |
| 5,178,595 A | * | 1/1993 | MacGregor | 482/75 |
| 5,518,224 A | * | 5/1996 | Anderson | 254/131 |
| 5,575,609 A | * | 11/1996 | Monkhorst et al. | 414/743 |
| 6,364,262 B1 | * | 4/2002 | Gibson et al. | 248/229.14 |
| 2002/0011392 A1 | * | 1/2002 | Yoshimoto et al. | 192/212 |
| 2002/0116768 A1 | * | 8/2002 | Grassi | 7/158 |
| 2003/0040234 A1 | * | 2/2003 | Oathout | 440/107 |

* cited by examiner

*Primary Examiner*—Saul Rodriguez
*Assistant Examiner*—Gina M. Lupino
(74) *Attorney, Agent, or Firm*—Walter A. Hackler

(57) ABSTRACT

A piano lyre crutch includes a panel having a top and a fixture for temporarily attaching the panel to a top of a grand piano lyre. A panel depending portion includes a length greater than a length of the depending lyre, which facilitates breakdown of the piano for transport without jeopardizing the lyre by the piano weight.

7 Claims, 3 Drawing Sheets

GRAND PIANO LYRE CRUTCH

The present invention generally relates to piano moving apparatus and more particularly relates to apparatus for facilitating the moving of grand pianos having depending lyres.

Procedures for moving grand pianos has remained substantially unchanged since the first production thereof although modern piano moving techniques have incorporated a number of lift devices along with padded dollies and the like.

Grand pianos are very delicate and require extreme care and handling despite the fact that they are notoriously cumbersome. As a result, they have not been amenable for handling and transport thereof.

Accordingly, piano movers typically rely solely on manpower to carefully lift the grand piano, tilt it on its side and carry it through passageways and the like for movement from room to room or building to building.

This difficult manual task includes removing the piano legs and carefully tilting the flat body of the piano on its side in order to place the piano on a padded support board or dolly.

This procedure is particularly dangerous for the piano lyre, which includes footpedals for operation of the piano. As a result of this possible damage, the piano must be carefully manipulated to afford damage and the labor intensive procedure required to safely move the grand piano as particularly onerous in situations in which the piano must be moved on a regular basis, such as, between concert locations.

The present invention provides for a lyre crutch, which facilitates the transport of a piano while at the same time preventing damage to the lyre and further facilitating piano transport.

SUMMARY OF THE INVENTION

A piano lyre crutch in accordance with the present invention generally includes a panel along with a fixture for temporarily attaching the panel to a top of the lyre. A panel depending portion includes a length greater than a length of the depending lyre. In this fashion, when the piano, with a leg removed, is pivoted, or rotated, or lowered, the panel undertakes the load and prevents contact of the lyre with the floor/ground. Accordingly, the integrity of the lyre is maintained in accordance with the present invention.

In one embodiment of the present invention, the fixture comprises a vice clamp having opposing chucks for engaging sides of the lyre top. The clamp may comprise a rod portion intermediate the opposing chucks with one of the opposing chucks being fixed to the rod portion and another of the opposing chucks being releasably fixed to the rod for clamping the lyre via top. This adjustability of the releasable chuck enables accommodation for various lyre tops (not shown).

Preferably, the rod portion passes through the panel top and a clamp stop disposed in the panel top is provided for positioning the lyre crutch between the opposing chucks. This feature enables the lyre crutch in accordance with the present invention to be centered in front of the piano lyre and position the depending portion at a position for receiving the weight of the piano upon the lowering of the piano with a leg removed, as hereinafter described in greater detail.

Preferably, the panel depending portion tapers toward a bottom thereof in order to facilitate positioning and visual alignment of the crutch with the lyre during the use thereof.

Still more particularly, the lyre crutch in accordance with the present invention may further include a foot disposed proximate a panel bottom for adjusting an effective length of the panel. In this manner, the crutch effective length can be changed to accommodate for various lengths of lyres so that the crutch will provide floor contact and support the piano weight upon movement, thus isolating the piano lyre form any load.

In another embodiment of the present invention, the fixture may comprise at least one bolt for removably fastening the panel to the lyre top.

In accordance with the present invention, a method for moving a grand piano generally includes temporarily attaching a panel to a piano lyre and thereafter removing a front leg of the piano.

A front end of the piano is then lowered over the removed leg to engage the panel with the floor with the lyre suspended above the floor to prevent any loading or possible damage thereto.

The piano is then rotated onto a side adjoining the removed leg and onto a dolly or the like, the remaining legs of the piano are removed and the piano is transported on the dolly.

More particularly, in accordance with the method of the present invention, an effective length of the panel can be extended to a position below the piano lyre before removing the first piano leg. This procedure insures protection of the lyre during movement of the piano utilizing the lyre crutch in accordance with the present invention.

BRIEF DESCRIPTION OF THE DRAWINGS

The present invention may be more clearly understood with the reference to the following detailed description in conjunction with the appended drawings, of which.

DETAILED DESCRIPTION

Figure 1:
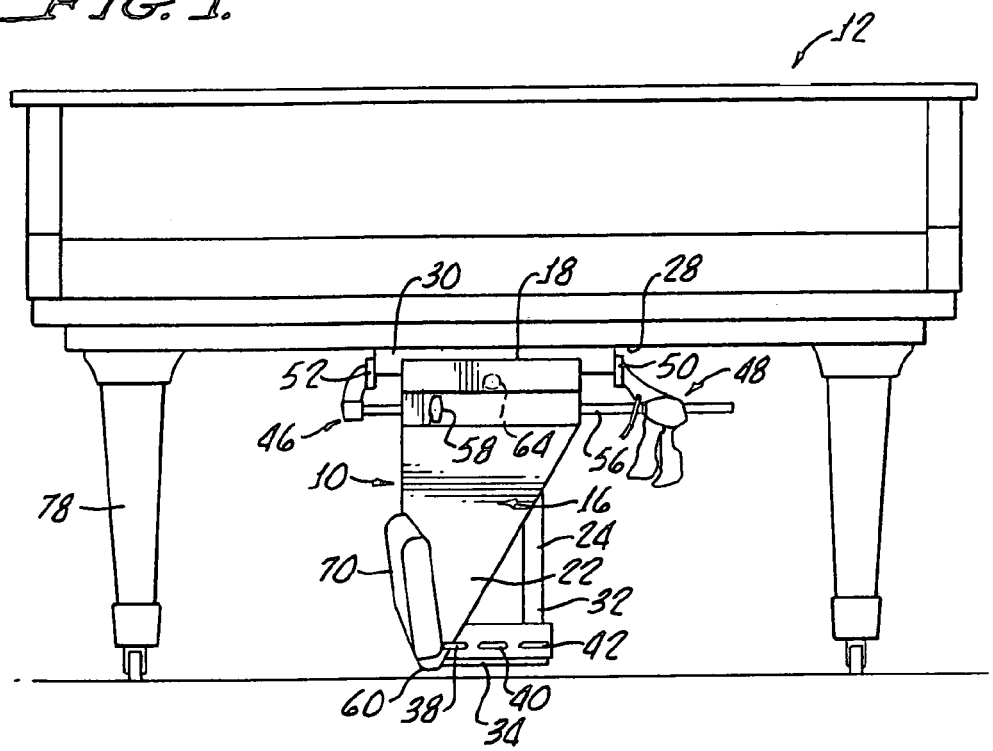
FIG. 1 is a front view of a piano lyre in accordance with the present invention as it may be temporarily attached to a lyre top of a grand piano.
Figure 2:
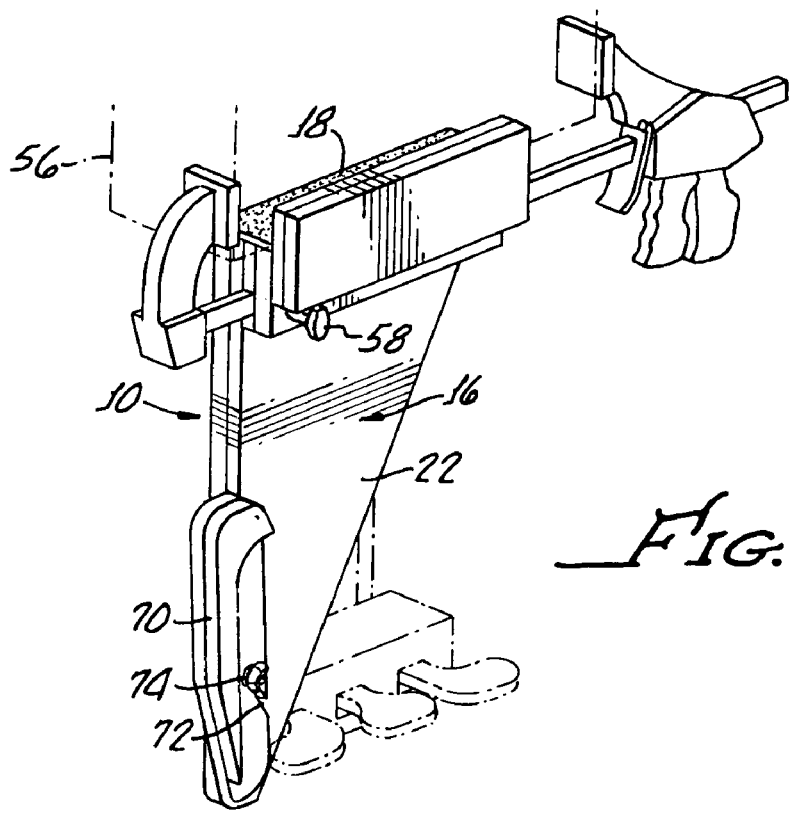
FIG. 2 is a perspective view of the lyre shown in FIG. 1 more clearly showing attachment of the panel to the lyre top by way of a clamp fixture.
Figure 3:
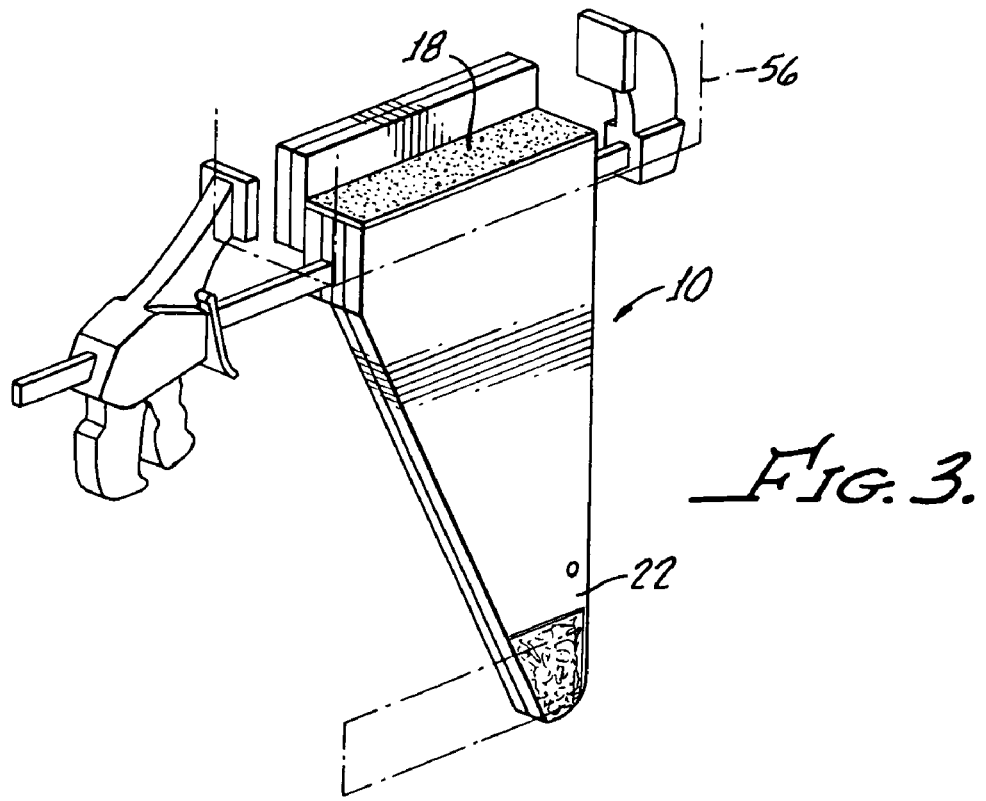
FIG. 3 is a perspective view of a back of the lyre shown in FIGS. 1 and 2 illustrating opposing chucks and a rod passing through a top of a lyre crutch panel.

With reference to FIGS. 1-3, there is shown a piano crutch 10 in accordance with the present invention for facilitating transport of a grand piano 12, as will be hereinafter described in greater detail.

In general, the crutch 10 includes a panel 16 having a top 18 and a depending portion 22 having a length greater than a length of a lyre 24 depending from an underside 28 of the piano 12.

The lyre 24 includes a top block 30 and depending legs 32 supporting a pedestal 34 which includes an una corda pedal 38, a sostenuto pedal 40 and a damper pedal 42 in a conventional manner. It should be appreciated that the lyre 24, legs 32 and pedals 38-42 are typically not constructed with sufficient stability for consistently supporting the piano 12 weight and are not part of the present invention.

As hereinafter described, the crutch 10 in accordance with the present invention enables the movement of the piano 12 without removal of the lyre 24 which greatly facilitates rapid movement of the piano 12 without stressing the lyre 24.

Alternatively, the crutch 10 and lyre 24 may be removed following upending of the piano 12. A fixture 46 which may include a vice clamp 48 is provided with opposing chucks 50, 52 for temporarily attaching the panel 16 to the top block 30 of the lyre 24, as shown in FIGS. 1-3.

The clamp 48 further includes a rod 56 for engaging the chucks 50, 52 in a conventional manner which passes through the panel top 18.

A clamp stop 58 is provided for temporarily fixing the rod 56 to the panel top 18 in order that the panel 16 may be centered in front of the lyre 24 with a lyre bottom proximate the pedal 38.

A tapered shape of the panel 16 toward the bottom 60 enables and facilitates positioning of the panel 16 by observing the lyre legs 32 and pedals 38-42.

The clamp stop 58 may be of any suitable structure for temporarily fixing the rod 56 within the panel top 18.

Alternatively, a bolt 64, shown in dashed line in the figures, may be utilized for a fixture for temporarily attaching the panel 16 to the lyre top 30 if a predrilled hole in the top block 30 of the lyre 24 is provided. It is anticipated that piano manufactures may utilize this arrangement for facilitating movement of grand pianos in accordance with the apparatus and method of the present invention, once of the benefits of the present invention are appreciated.

Figure 4:
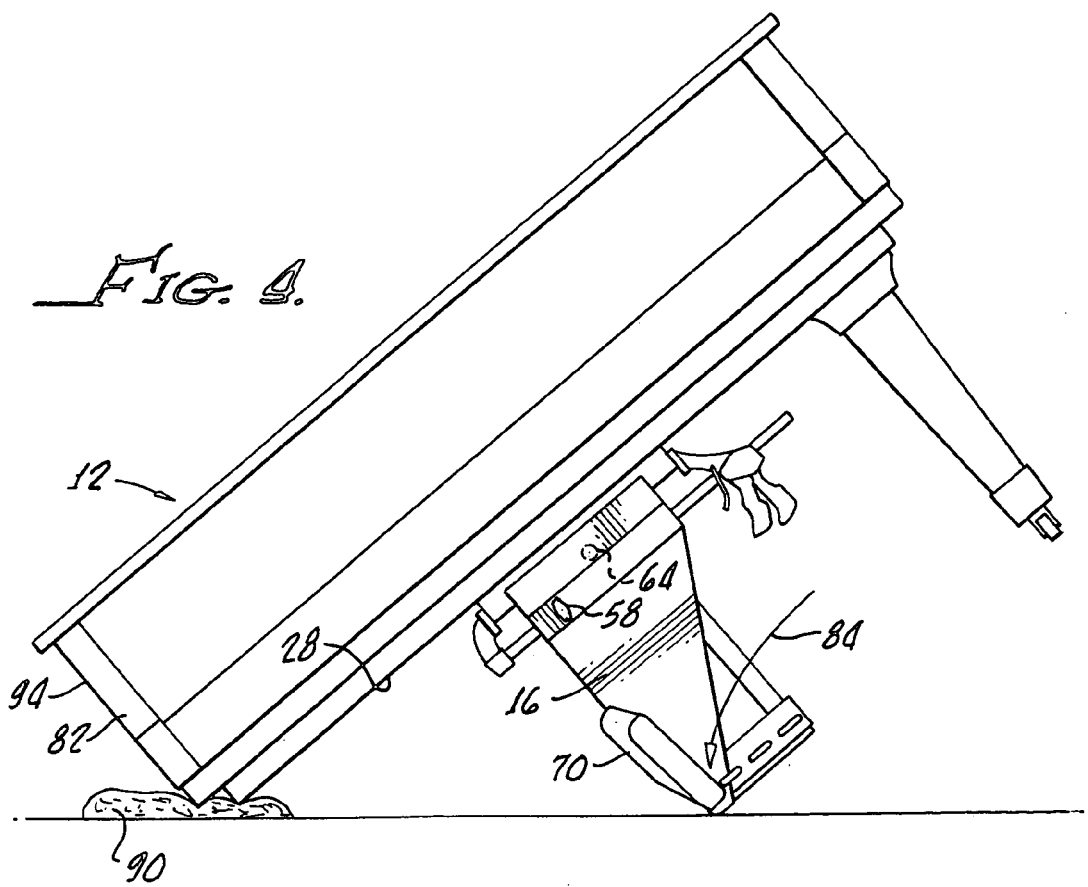
FIGS. 4-5 illustrate the method in accordance with the present invention for moving a piano while at the same time insuring integrity of the piano lyre.

With specific reference to FIGS. 1, 2 and 4, a foot may be provided and disposed proximate the panel bottom 60 for adjusting an effective length of the panel 16. As best shown in FIG. 2, the foot 70 includes a slot 72 and a bolt arrangement 74 through the panel 16 enables the foot 70 to be moved vertically with respect to the panel 16 and effectively lengthen the panel 16 as may be necessary for various lengths of lyres (not shown) for different pianos (not shown).

It should be appreciated that the crutch 10, including the panel 16 and foot 70 may be made from conventional materials, such as plywood or the like. However, any suitable materials capable of bearing the weight of a piano should be considered to be within the scope of the present invention.

Figure 6:
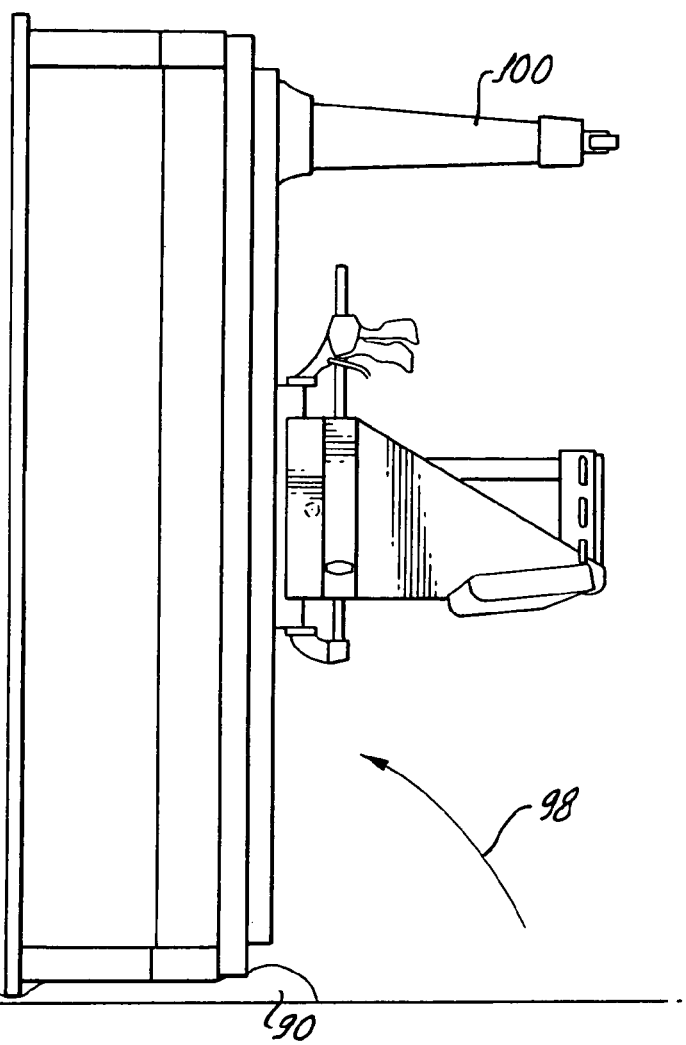
FIG. 6 an enlarged perspective view of the lyre bottom illustrating the load bearing nature of the lyre and accordingly preventing any load from being exerted on a bottom of the piano lyre.
Figure 5:
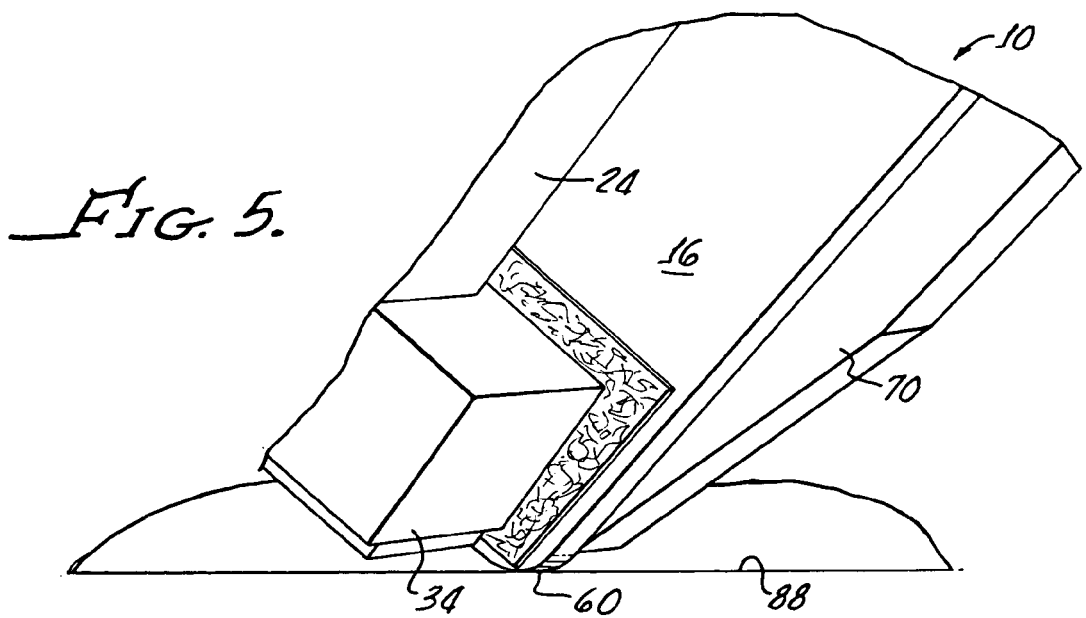

A method in accordance with the present invention for moving a grand piano is illustrated in FIGS. 4-6. After temporarily attaching the panel 16 to the piano lyre 24, as hereinabove described, a front leg 78 (see FIG. 1), is removed. The piano 12 is lowered at a front end 82 of the piano over the removed leg 78 in order to rotate the piano in a direction of arrow 84 and engage the panel 16 with a floor 88, as shown in FIG. 4, and more particularly shown in FIG. 5. As illustrated, the piano may be rested on a dolly or mat 90 while the pedestal 34 is prevented from engaging the floor 88 by the load-bearing panel 16.

Thereafter, the piano 12 is rotated onto a side 94, as illustrated by the arrow 98 in FIG. 6. The remaining piano legs 100 may be optionally removed as well as the lyre 24 and panel 16 for further convenience in moving.

Set up of the piano is followed in a reverse manner in accordance with the method hereinabove set forth.

Although there has been hereinabove described a specific grand piano lyre crutch and method in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A piano lyre crutch for use in transport of a grand piano having a depending lyre attached thereto, said depending lyre having a top block, a pedestal, and interconnected legs, the crutch comprising:
    a piano weight supporting panel having a top and a depending portion; and
    a fixture for temporarily attaching the panel top to the lyre top block with the panel depending portion extending past the lyre pedestal to enable transport of the grand piano with the lyre attached without floor contact with the lyre pedestal, said fixture comprises a vice clamp having opposing chucks for engaging sides of the lyre top block.

2. The crutch according to claim 1 wherein said vice clamp comprises a rod portion interconnecting said opposing chucks, one of said opposing chucks being fixed to said rod portion and another of said opposing chucks being releasably fixed to said rod portion for clamping the lyre top block therebetween.

3. The crutch according to claim 2 wherein said rod portion passes through the panel top.

4. The crutch according to claim 3 further comprising a clamp stop disposed in the panel top for positioning the lyre crutch between said opposing chucks.

5. The crutch according to claim 1 wherein said panel depending portion tapers toward a bottom thereof.

6. The crutch according to claim 1 further comprising a foot disposed proximate a panel bottom for adjusting an effective length of said panel.

7. The crutch according to claim 1 wherein said fixture comprises at least one bolt for fastening said panel to the lyre top block.

* * * * *